(12) United States Patent
Han et al.

(10) Patent No.: US 7,447,704 B2
(45) Date of Patent: Nov. 4, 2008

(54) PIVOT ANALYSIS WITH XML/XSL MECHANISM

(75) Inventors: Shuang-Fu Han, Tao-Yuan (TW); Fu-Bin Peng, Kaohsiung (TW); Chang-Chun Lai, Taipei (TW); Yi-Chen Hsu, Taipei (TW); Wen-Hao Hsu, Taipei (TW)

(73) Assignee: InfoPower Corporation, Taipei (TW)

( * ) Notice: Subject to any disclaimer, the term of this patent is extended or adjusted under 35 U.S.C. 154(b) by 469 days.

(21) Appl. No.: 10/983,234

(22) Filed: Nov. 8, 2004

(65) Prior Publication Data

US 2006/0101329 A1    May 11, 2006

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 7/00 | (2006.01) |

(52) U.S. Cl. .................... 707/104.1; 707/101; 715/239
(58) Field of Classification Search ................. 707/101, 707/104.1; 715/239
See application file for complete search history.

(56) References Cited

U.S. PATENT DOCUMENTS

| | | | |
|---|---|---|---|
| 7,065,704 B1* | 6/2006 | Xu | 715/509 |
| 2004/0186821 A1* | 9/2004 | Matson et al. | 707/1 |
| 2004/0243923 A1* | 12/2004 | Nakamura | 715/500 |
| 2006/0074904 A1* | 4/2006 | Mungara et al. | 707/5 |

* cited by examiner

Primary Examiner—Apu Mofiz
Assistant Examiner—Jared M Bibbee
(74) Attorney, Agent, or Firm—Winston Hsu

(57) ABSTRACT

A pivot analysis with an XML/XSL mechanism is disclosed. The pivot analysis is utilized to acquire the raw data from a relational database and then the raw data is converted into a XML data by a pivot transformation mechanism. Furthermore, the XSL/XSLT mechanism is configured to modify the XML data and thus the post processing of the pivot tables, for instance, a row calculation and a column calculation can be performed.

18 Claims, 23 Drawing Sheets

| Institutional city | Expenditure persons | Expenditure persons of Taipei city | Expenditure persons of Hsinchu city | Expenditure persons of Kaohsiung city |
|---|---|---|---|---|
| Taipei city | 30000 | 30000 | 0 | 0 |
| Taipei city | 3000 | 3000 | 0 | 0 |
| Taipei city | 300 | 0 | 300 | 0 |
| Taipei city | 30 | 0 | 0 | 30 |
| Hsinchu city | 20000 | 20000 | 0 | 0 |
| Hsinchu city | 2000 | 2000 | 0 | 0 |
| Hsinchu city | 200 | 0 | 200 | 0 |
| Hsinchu city | 20 | 0 | 0 | 20 |
| Kaohsiung city | 10000 | 10000 | 0 | 0 |
| Kaohsiung city | 1000 | 1000 | 0 | 0 |
| Kaohsiung city | 100 | 0 | 100 | 0 |
| Kaohsiung city | 10 | 0 | 0 | 10 |

FIG. 1B (Prior Art)

| Country | A | | B | | |
|---|---|---|---|---|---|
| State | a | b | b | c | e |

| Year | Season | | | | |
|---|---|---|---|---|---|
| 2003 | Q1 | | | | |
| | Q2 | | | | |
| | Q3 | | | | |
| 2004 | Q3 | | | | |
| | Q4 | | | | |

FIG. 3A

Expenditure

| Year | Season | Country | State | Amount |
|------|--------|---------|-------|--------|
| 2003 | Q1 | A | a | 1000 |
| 2003 | Q1 | A | b | 2000 |
| 2003 | Q1 | B | b | 3000 |
| 2003 | Q1 | B | c | 4000 |
| 2003 | Q1 | B | d | 5000 |
| 2003 | Q2 | A | a | 6000 |
| 2003 | Q3 | A | a | 7000 |
| 2004 | Q3 | A | a | 8000 |
| 2004 | Q4 | A | a | 9000 |

Vertical dimension: Year, Season
Horizontal dimension: Country, State
Measure field: Amount

FIG. 3B

| | | Country | | | | | | | |
|---|---|---|---|---|---|---|---|---|---|
| | | | A | | | B | | | |
| Year | Season | Sum | Sum | a | b | Sum | b | c | d |
| Sum | | 45000 | | | | | | | |
| 2003 | Sum | | 16000 | | | 12000 | | | |
| | Q1 | | | 1000 | 2000 | | 3000 | 4000 | 5000 |
| | Q2 | | | 6000 | | | | | |
| | Q3 | | | 7000 | | | | | |
| 2004 | Sum | | 17000 | | | | | | |
| | Q3 | | | 8000 | | | | | |
| | Q4 | | | 9000 | | | | | |

Pivot Analysis Available Fields

| Name | Service | Type | Stage | Stage Rank | Opportunity |
|------|---------|------|-------|------------|-------------|
| Amount | Year | | | | |

Row Setting

Type | Service

Column Setting

Measure Setting: Amount COUNT

Layout: By Column  [Submit] [Close] [Clean] [Filtering]

| | Total | Design | | Gartner | | Harvard | | Software | |
|---|---|---|---|---|---|---|---|---|---|
| | COUNT(Amount) | COUNT(Amount) | | COUNT(Amount) | | COUNT(Amount) | | COUNT(Amount) | |
| Total | 158.0 | 30.0 | | 29.0 | | 59.0 | | 67.0 | |
| Best | 11.0 | | | 3.0 | | 5.0 | | 3.0 | |
| Commitment | 96.0 | 30.0 | | 16.0 | | 32.0 | | 45.0 | |
| Pipeline | 51.0 | | | 10.0 | | 22.0 | | 19.0 | |

Pivot Analysis Toolbar

| Add Calc. | Add Calc. | Show All | | Measure | Measure | Position | KPI |
|---|---|---|---|---|---|---|---|
| Row | Column | Column & Row | Ratio | Format | of Total | Setting | |

Row  ○ Before  ● After

Column ● Before  ○ After

[Cancel]

File  Edit  View  Favorites  Tools  Help

Pivot Analysis Available Fields

| Name | Service | Type | Stage | Stage Rank | Opportunity |
| Amount | Year | | | | |

Row Setting

Service

Column Setting

Type

Measure Setting

Amount  SUM ▽

Type    COUNT ▽

Layout: By Column ▽  [Submit] [Close] [Clean] [Filtering] ▽

| | Total | | Best | | Commitment | | Pipeline | |
|---|---|---|---|---|---|---|---|---|
| | SUM(Amount) | Count(Type) | SUM(Amount) | Count(Type) | SUM(Amount) | Count(Type) | SUM(Amount) | Count(Type) |
| Total | 1580.0 | | 110.0 | | 960.0 | 11.0 | 510.0 | 51.0 |
| Design | 30.0 | 3.0 | | | 30.0 | 3.0 | | |
| Gartner | 290.0 | 29.0 | 30.0 | | 160.0 | 16.0 | 100.0 | 10.0 |
| Harvard | 590.0 | 59.0 | 50.0 | | 320.0 | 32.0 | 220.0 | 22.0 |
| Software | 670.0 | 67.0 | 30.0 | | 450.0 | 45.0 | 190.0 | 19.0 |

Pivot Analysis Toolbar

| Add Calc. Row | Add Calc. Column | Show All Column & Row | Measure Ratio | Measure Format | Position of Total | KPI Setting |

FIG. 50

PIVOT ANALYSIS WITH XML/XSL MECHANISM

BACKGROUND OF THE INVENTION

1. Field of the Invention

The present invention generally relates to an application of data processing, and more particularly to the application of data processing with a pivot analysis based on XML (eXtensible Markup Language) and XSL (extensible Stylesheet Language).

2. Description of the Prior Art

SQL (Structured Query Language) is a standard language used to access the data in a relational database, for instance, to insert, acquire, modify and delete the data. In addition, the SQL includes statements that are used to define and manage the objects in a relational database. SQL is published and available from ISO (International Organization for Standardization) and ANSI (American National Standards Institute), and several relational databases support SQL.

In the related prior art, a user manually uses SQL to convert the raw data in a relational database into a cross table. A practical example of expenditure data will be described in the following, and Table 1 depicts the raw data of the practical example. First, moving the data for each column item manually as shown in FIG. 1A, this includes three commands as shown in the following:

DECODE (Expenditure city, 'Kaohsiung city', Expenditure persons, 0)

DECODE (Expenditure city, 'Hsinchu city', Expenditure persons, 0)

DECODE (Expenditure city, 'Taipei city', Expenditure persons, 0)

Next, aggregating some relational data of the expenditure data, this is shown in FIG. 1B. Accordingly, the cross table built up by the user is shown in Table 2. However, the problems of the above-mentioned method include, the column item being moved is a fixed column item set and it is not dynamic; the setting process is heavy and complicated and thus it is difficult to maintain and revise; and the user have to view the aggregate data and detail data in different pages and thus it loses the relationship between the aggregate data and the detail data.

TABLE 1

| Institutional city | Expenditure city | Expenditure persons | Expenditure Date |
|---|---|---|---|
| Taipei city | Taipei city | 30000 | 2003/1/1 |
| Taipei city | Taipei city | 3000 | 2003/1/2 |
| Taipei city | Hsinchu city | 300 | 2003/1/3 |
| Taipei city | Kaohsiung city | 30 | 2003/1/31 |
| Hsinchu city | Taipei city | 20000 | 2003/1/1 |
| Hsinchu city | Taipei city | 2000 | 2003/1/2 |
| Hsinchu city | Hsinchu city | 200 | 2003/1/3 |
| Hsinchu city | Kaohsiung city | 20 | 2003/1/31 |
| Kaohsiung city | Taipei city | 10000 | 2003/1/1 |
| Kaohsiung city | Taipei city | 1000 | 2003/1/2 |
| Kaohsiung city | Hsinchu city | 100 | 2003/1/3 |
| Kaohsiung city | Kaohsiung city | 10 | 2003/1/31 |

TABLE 2

| Institutional city | Expenditure persons | Expenditure persons of Taipei city | Expenditure persons of Hsinchu city | Expenditure persons of Kaohsiung city |
|---|---|---|---|---|
| Taipei city | 33330 | 33000 | 300 | 30 |
| Hsinchu city | 22220 | 22000 | 200 | 20 |
| Kaohsiung city | 11110 | 11000 | 100 | 10 |

SUMMARY OF THE INVENTION

According to the problems of the prior art, the present invention provides a method and system of converting the raw data in the relational database into the cross table. In addition, the system includes the functions of performing a post processing of the data and adjusting the layout of the tables.

Accordingly, one of the purposes of the present invention is to provide an application of pivot analysis with an XML/XSL mechanism. The pivot analysis utilizes a series of special designs and extensions based on XML and XSL, and a design of some related attributes of the tables. After the data structure of XML data with extensibility and elasticity is achieved, those data can be performed a post processing by using a web utility, where the post processing includes row calculation, column calculation, data sorting, data moving, percentage calculation of measure fields, data collapsing and layout.

Another purpose of the present invention is to provide a pivot analysis mechanism. The pivot analysis mechanism is utilized to convert the raw data in a relational database into the cross table, and then a post processing of the data is performed, for instance, to add or to delete the measure field. Besides, the pivot analysis mechanism of the present invention reduces the requirement of the memory and the operational method is easy to work; that is, what you see is what you get.

BRIEF DESCRIPTION OF THE DRAWINGS

The present invention can be best understood through the following description and accompanying drawings, wherein:

FIG. 1A~FIG. 1B are the diagrams of converting the raw data into the cross table by using SQL;

FIG. 3A~FIG. 3C are the diagrams of converting the raw data into the cross table by using SQL according to an embodiment of the present invention;

DESCRIPTION OF THE PREFERRED EMBODIMENT

Some appropriate and preferred embodiments of the present invention will now be described in the following. It should be noted, however, that the embodiment is merely an example and can be variously modified without departing from the range of the present invention.

Figure 1A:
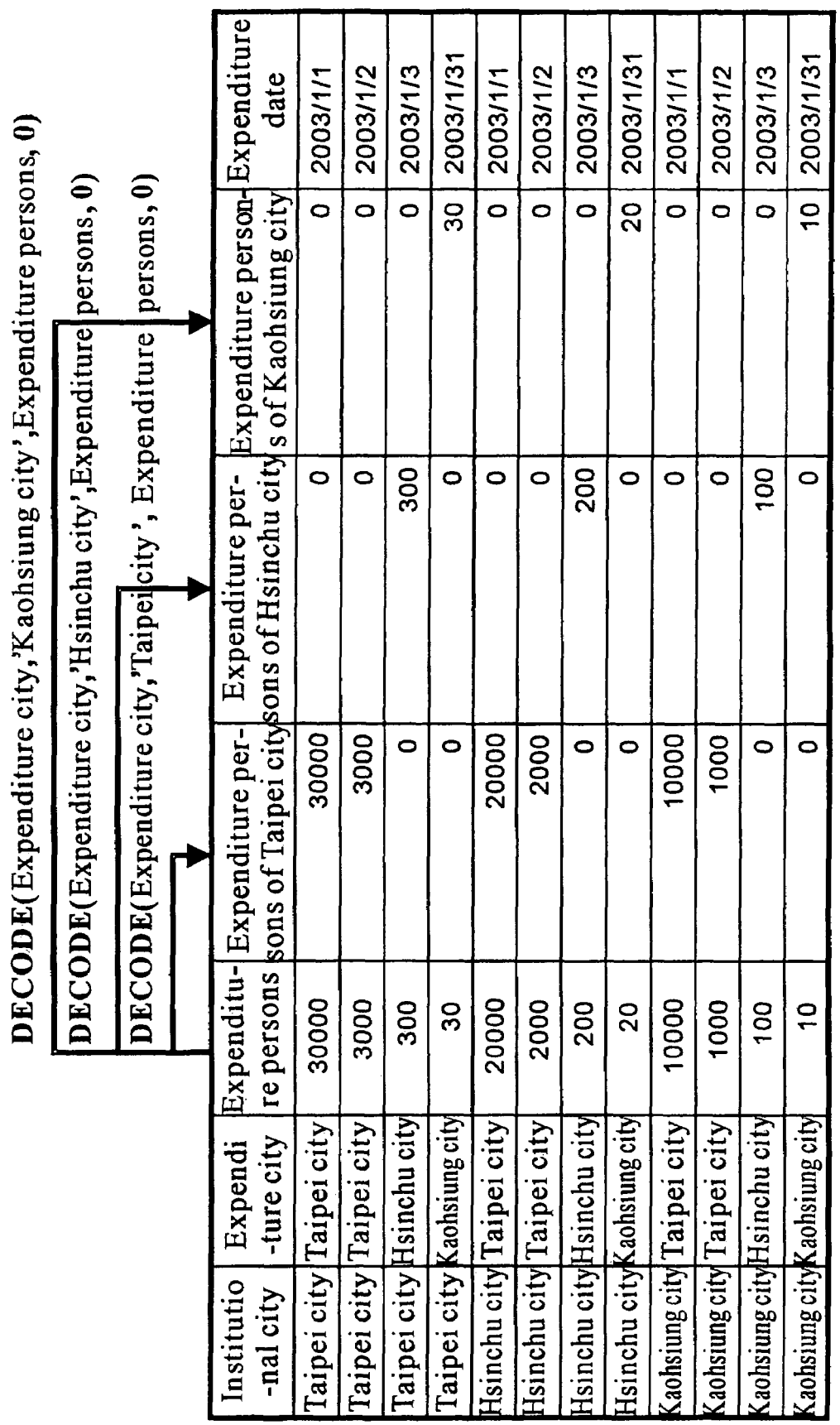
Figure 2A:
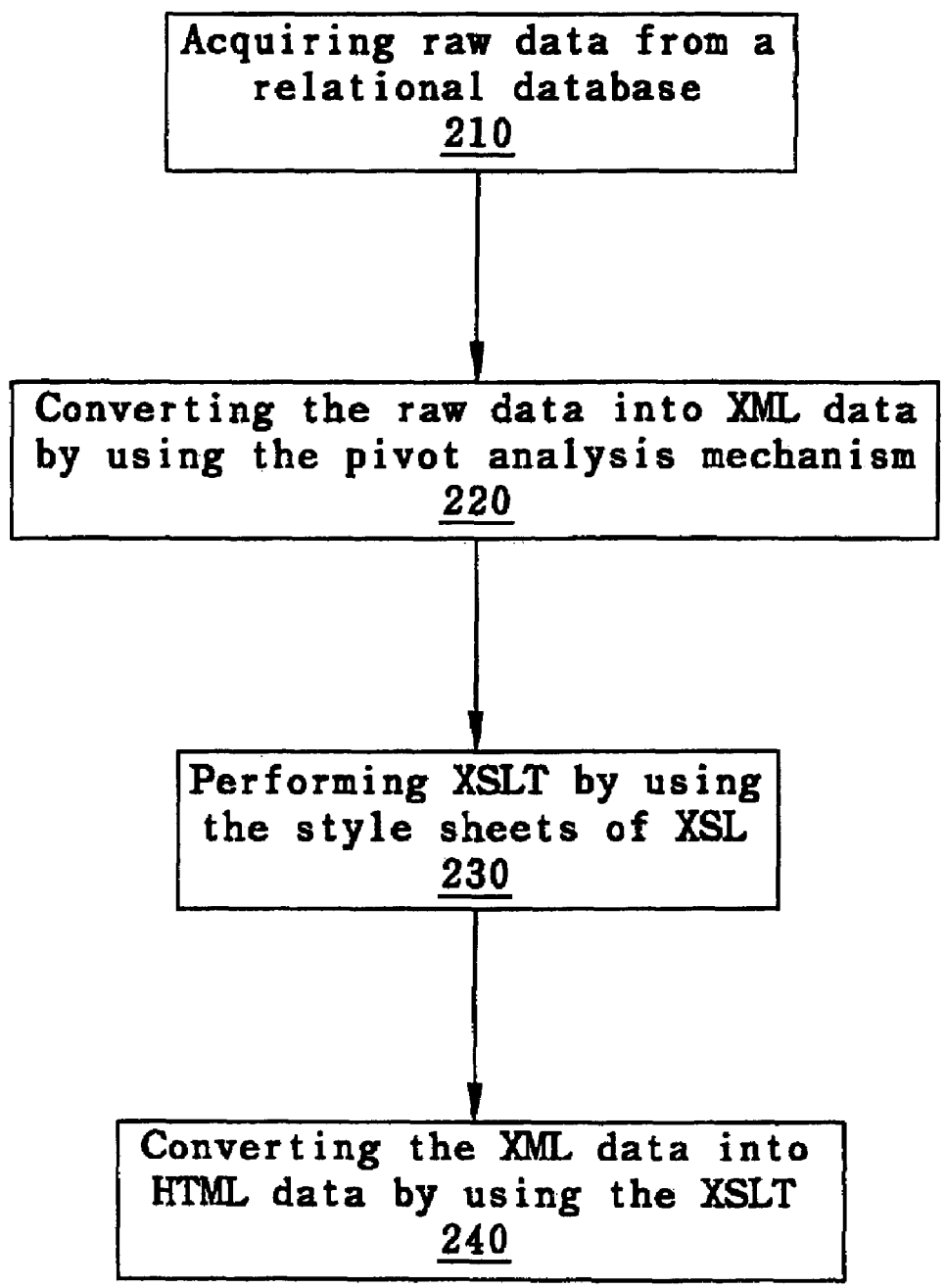
FIG. 2A is the flowchart of the pivot analysis according to an embodiment of the present invention.

FIG. 2A is the flowchart of the pivot analysis according to an embodiment of the present invention, which illustrates the operation principle of a pivot analysis module. First, step 210 is acquiring raw data from a relational database, and the method of acquiring the raw data is directly selecting the tables and the fields of the database. The relational database can be one of various kinds of databases, which includes IBM, UNIX, Sybase, Oracle and Microsoft Access. Next, step 220 is converting the raw data into XML data by using the pivot analysis mechanism. It should be appreciated herein that, XML and XSL are popular technologies at the present, XML is a markup language used to mark up the electrical documents having structured information. XML is initially established according to SGML (Standard Generalized Markup Language), and the format of XML is similar to HTML, while XML can use the user-defined tags and the document structures. Further, XML can acquire data from the database and then perform a data serializing step. The main characteristic of the XML documents is structured document-oriented and information content-oriented, and the essence of the structured documents and the method of message encoding is to raise its efficacy and efficiency when processing repeated and shared data in a electrical data transferring system, a computer-aided manufacturing system and a database management system. Furthermore, the method can discriminate between information content, data structure and data format form different essential factors of the documents.

And next, step 230 is performing XSLT by using the stylesheets of XSL. It should be appreciated herein that, XSL is a language to describe the stylesheets, and W3C (World Wide Web Consortium) presents 1.0 version of the XSL format in October, 2001. XSL consists of two parts, including XSL Transformations (XSLT), which is a language for transforming XML, and XSL Formatting Objects (XSL FO), which is an XML based markup language describing the formatting of XML data for output to screen, paper or other media; in addition, the data structure of the documents can be converted into another data structure by using the stylesheets of XSL. XSL essentially constitutes a transformation rule by templates and a match pattern. When the result matches the match pattern, a result tree is set up according to the template contents of the templates. In the template contents, several commands of XSL can be used to select the content of any node in a source tree. In addition, a tag or an attribute can be established in the result tree by using XSL commands. Accordingly, the final result is different with the data structure of the source documents.

XSL templates are used to describe how the documents are converted into XML documents by using XSL Formatting Objects and further describe the display method of XML documents. XSL provides software designers the tools to describe which field data of the XML pages should be displayed, accurate display location and the way how to be displayed. Besides, XSL can also be repeatedly used in several XML documents. For instance, displaying the data in a general web page by using XSL, users can control the appearance of displaying the data of original XML documents in a web browser, e.g., font size, font format and location.

Figure 2B:
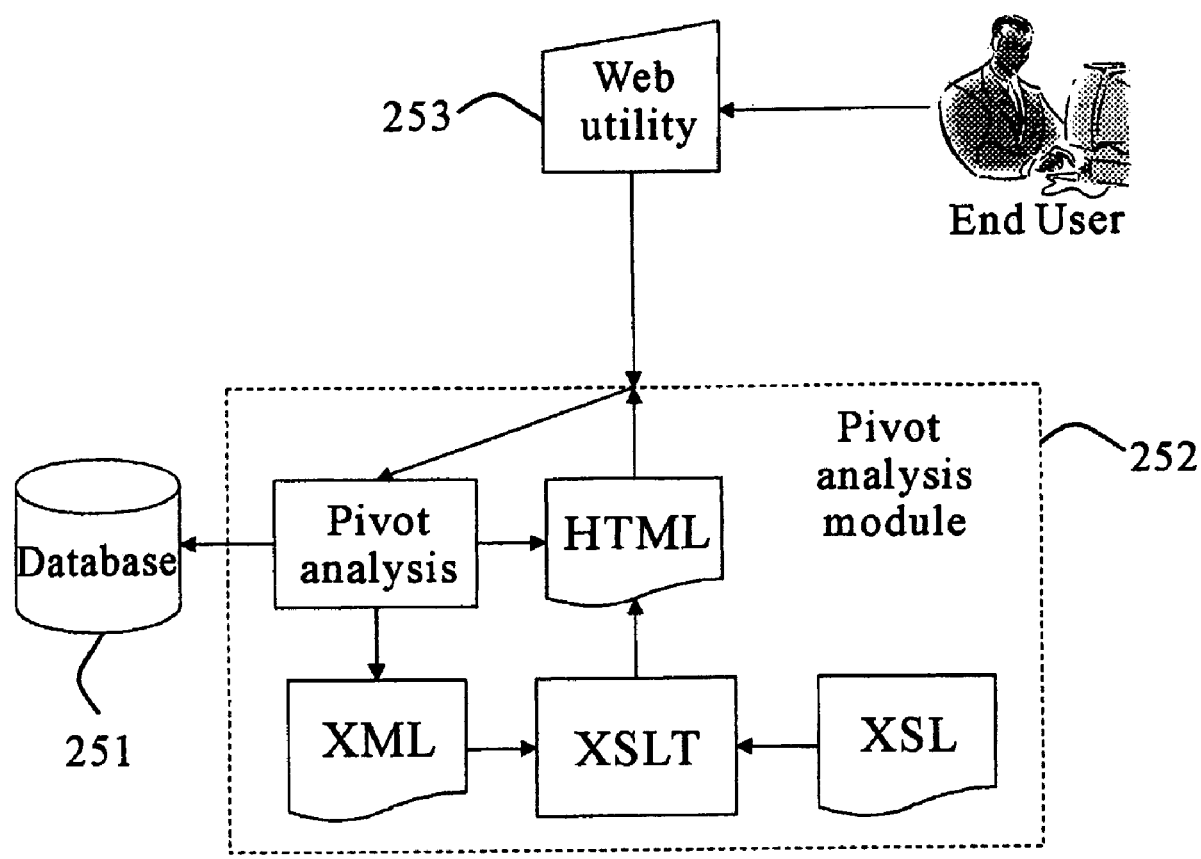
FIG. 2B is the architecture diagram of the pivot analysis system according to an embodiment of the present invention.

Now back to FIG. 2A. Finally, step 240 is converting the XML data into HTML (Hypertext Markup Language) data by using the XSLT. In addition, FIG. 2B is the architecture diagram of the pivot analysis system according to an embodiment of the present invention. The system at least includes a database 251, a pivot analysis module 252 and a web utility 253, which illustrates the operational principle of the pivot analysis. Further, the pivot analysis module 252 is configured to convert the raw data in the database 251 into XML data, perform XSLT by using stylesheets of XSL and convert the XML data into HTML data.

Figure 3A:
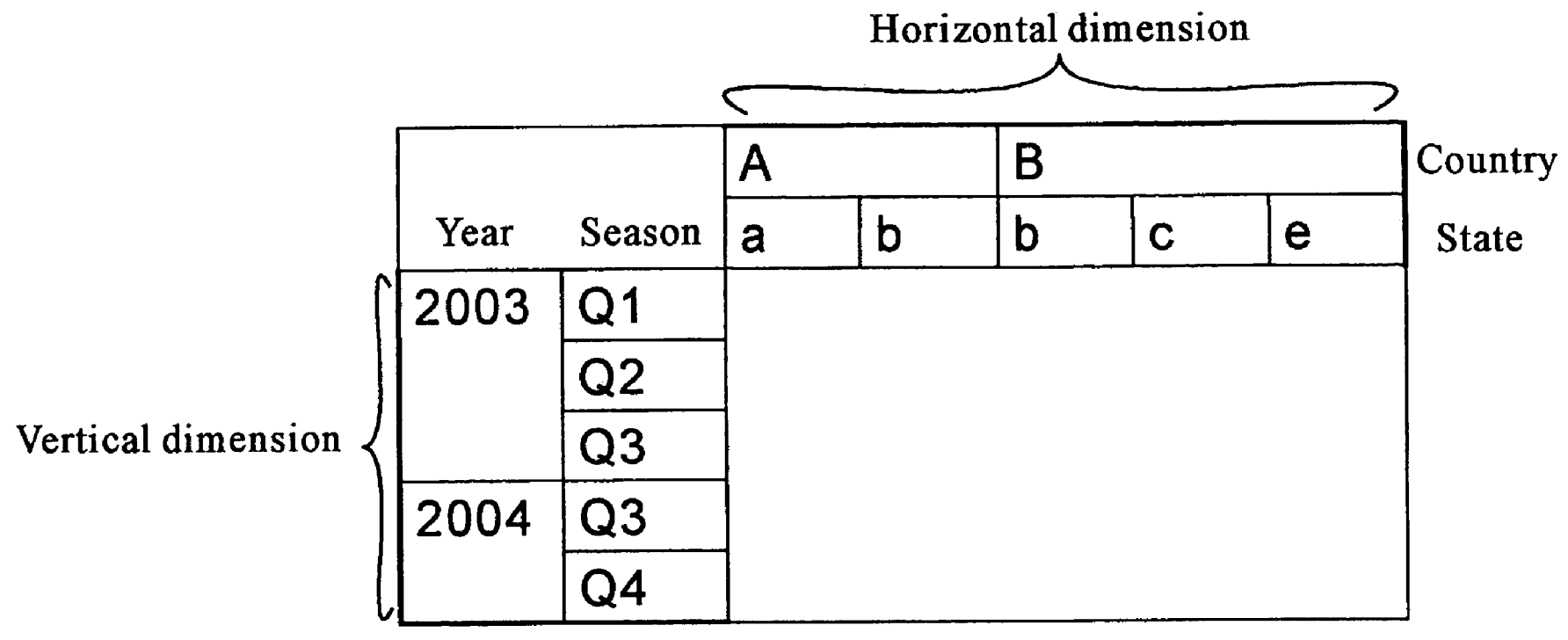

In order to further illustrate the pivot analysis mechanism of the present invention, some simple concepts of dimension will be described below. As is shown in FIG. 3A, it is a two-level hierarchical dimension table including a vertical dimension and a horizontal dimension, where the vertical dimension includes the data of Year and Season, and the horizontal dimension includes the data of Country and State. FIG. 3B depicts the two-level hierarchical dimension table of expenditure data, which includes a vertical dimension, a horizontal dimension and a measure field. In addition, FIG. 3C is the diagram of converting the raw data into the cross table by using a GROUP BY statement of the standard ANSI SQL. For instance, a table of the expenditure data (as is shown in FIG. 3B) including five fields: Year, Season, Country, State and Amount. When a cross table with the row fields including Country and State, the column fields including Year and Season, and Amount, there is a need to access nine SQL commands. The formula of the numbers of the SQL commands is shown in the following:

The numbers of SQL commands=(the numbers of the row fields+1)×(the numbers of the column fields+1)

$$\Rightarrow 9=(2+1)\times(2+1)$$

Nine SQL commands are shown in the following:
Select Sum(Amount) from Expenditure
Select Sum(Amount) from Expenditure Group By Year
Select Sum(Amount) from Expenditure Group By Year, Season
Select Sum(Amount) from Expenditure Group By Country
Select Sum(Amount) from Expenditure Group By Country, State
Select Sum(Amount) from Expenditure Group By Year, Country
Select Sum(Amount) from Expenditure Group By Year, Season, Country
Select Sum(Amount) from Expenditure Group By Year, Country, State
Select Sum(Amount) from Expenditure Group By Year, Season, Country, State The above-mentioned data structure of the data is similar to the concept of coordinates. For instance, a two-dimension table has two coordinate axes that are respectively a row-filed coordinate axis and a column-field coordinate axis. In addition, the row-field coordinate axis and the column-field coordinate axis are essentially hierarchical tree data structures. In consideration of performing an easier and smoother follow-up procedure, the embodiments of the present invention use the depth-first search (DFS) method to perform the data serialization and the path of each node is used to represent its identification. The method of data records includes a three-field structured array, and the three fields are row field coordinate, column field coordinate and measure field.

Figure 4:
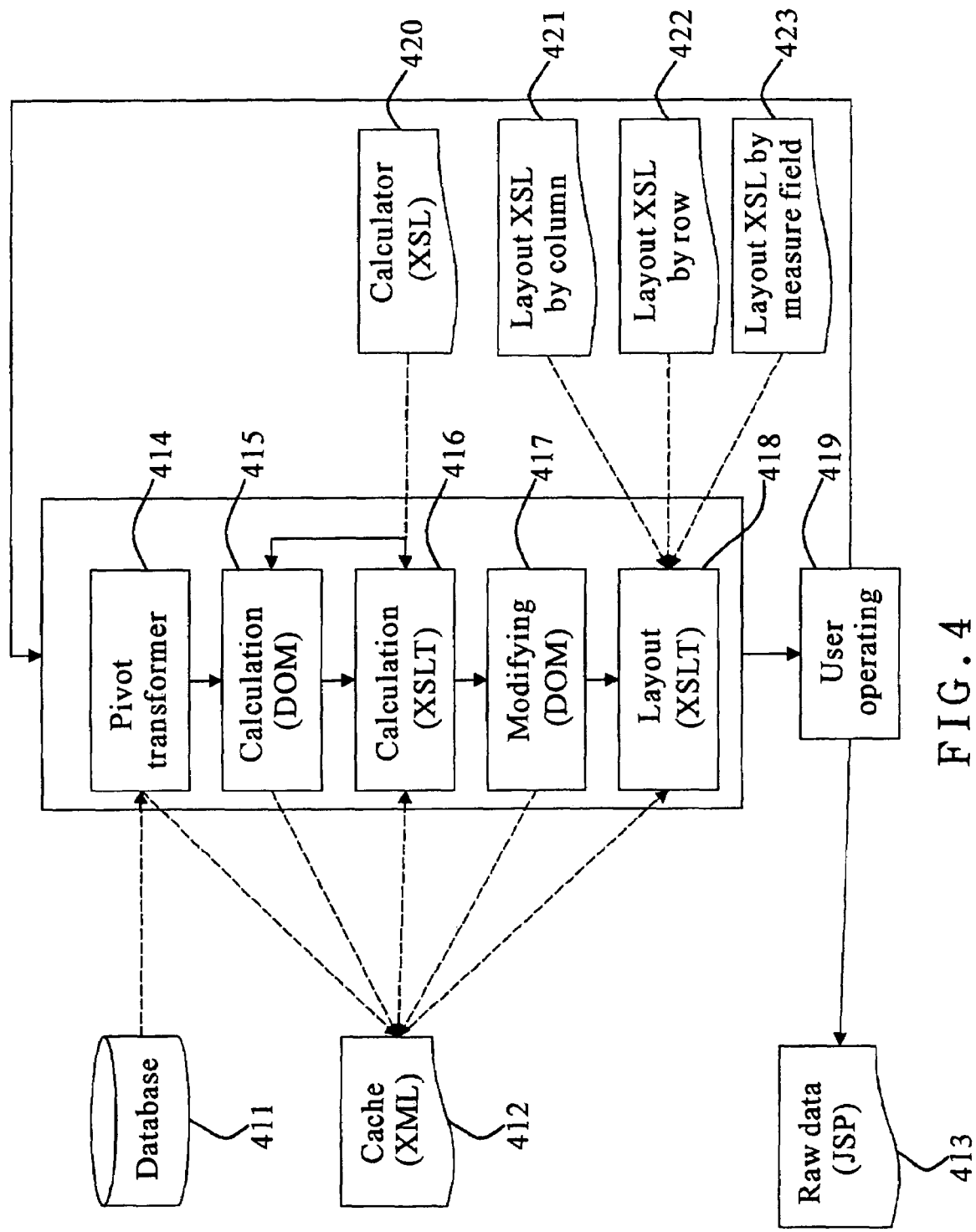
FIG. 4 is the internal architecture diagram of the pivot analysis system according to an embodiment of the present invention.

FIG. 4 is the internal architecture diagram of the pivot analysis system according to an embodiment of the present invention. First, after data converting is finished, the raw data in a database 411 will be saved as XML temporary files in cache 412. And then, the pivot transformation mechanism with a pivot transformer 414 uses XSL to perform calculation 415 and 416 (for instance, row calculation, column calculation and percentage calculation of measure fields). When the row calculation or the column calculation is performed, the mechanism takes each data item of the row or the column as a parameter, where the parameter is used to solve an equation including the parameter by using calculator (XSL) 420 and then a calculation result of the equation is acquired. When the percentage calculation is performed, the mechanism looks for its denominator of each data item and then is divided by the data item for acquiring the percentage. Moreover, as is described above, the raw data is saved as XML temporary file in the cache 412 after data converting. Accordingly, when the user operation 419 (for instance, a row/column moving or a row/column hiding) is needed to be performed, the DOM (Document Object Model) is used to modify the XML data 417. And the data layout 418 is performed by using templates of XSL along with XSLT for converting the data into HTML data. Further, data layout 418 includes a layout XSL by column 421, layout XSL by row 422 and layout XSL by measure filed 423. However, each raw data 413 in the database results in one single analysis result. That is, a user must start all over and go through each step in pivot analysis every time he tries to reach and update his analysis result, by applying the dynamic web page technology, such as JSP (Java Server Pages) and ASP (Active Server Pages).

After the data structure of XML data with extensibility and flexibility is achieved, the data can be performed a post processing by using a web utility, where the post processing includes row calculation, column calculation, data sorting, data moving, percentage calculation, data roll-up and data layout including three ways: "layout by row field", "layout by column field" and "layout by measure field".

Figure 5A:
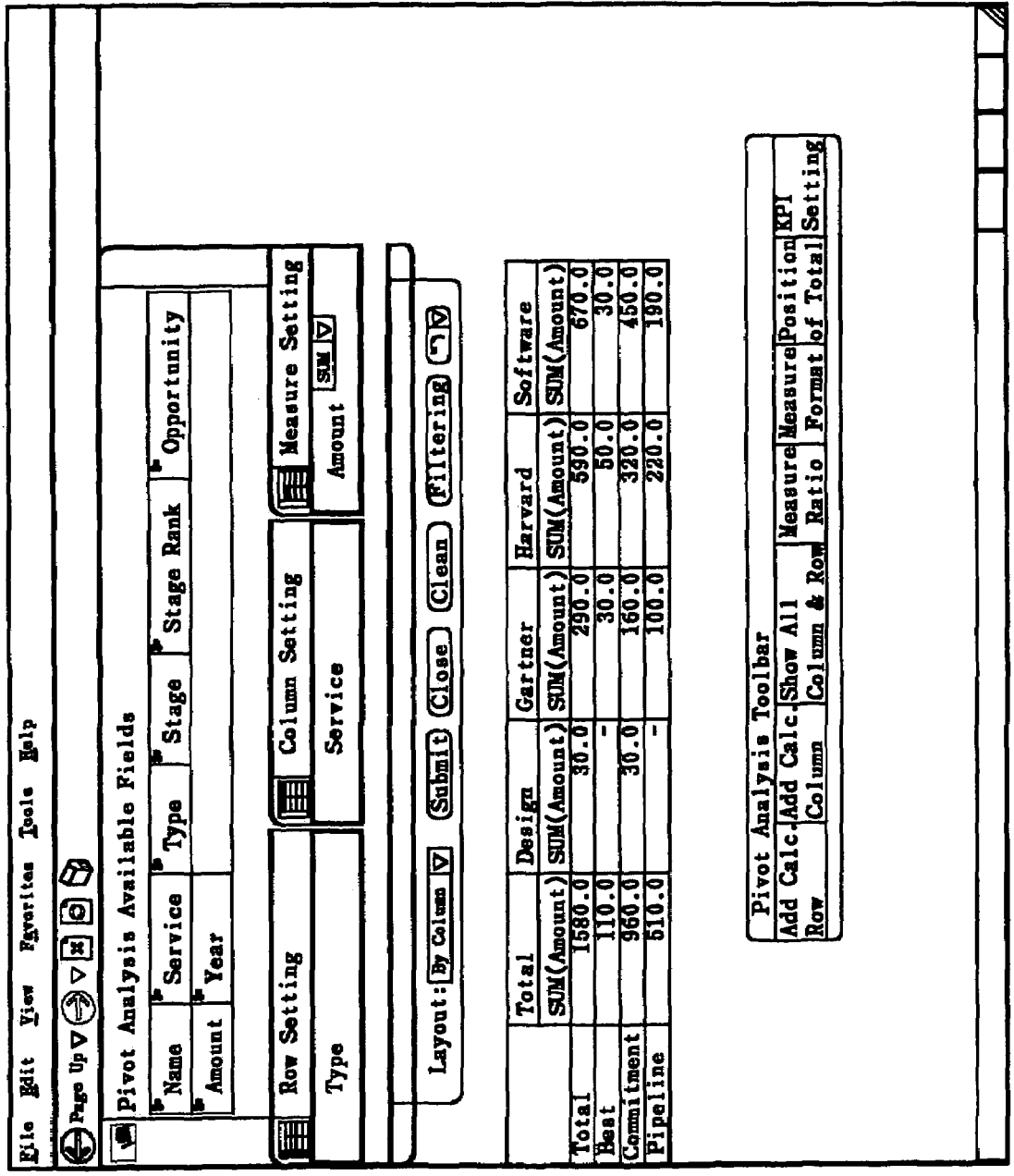
FIG. 5A~FIG. 5O are the diagrams of the pivot analysis mechanism along with QuickCORE.

Besides, in order to further illustrate the advantages and features of the embodiments according to the present invention, some practical examples will be described in the following. FIG. 5A~FIG. 5O are the diagrams of the pivot analysis mechanism along with QuickCORE. Therefore, the cross table can be edited in advance and of use in data analysis. It should be appreciated herein that, QuickCORE is a whole new OPAS (Opportunistic Application Server), which includes three-level architecture that are respectively the QuickCORE client programs, the QuickCORE server and the database. The QuickCORE client programs provide a user friendly interface to assist users to edit and manage the analysis report, thus the users don't have to know how to write program language. The QuickCORE server is used to access the execution of the back-end programs and the related setting of the database system. The edited documents in the Quick-CORE client can be uploaded to the QuickCORE server by using the function, "Go to Server". Finally, the dynamic and real-time web pages are finished. Furthermore, the documents can include various files, for instance, JSP files, HTML files, Image files and Video files. Accordingly, because of its high performance, stability, good extension and easy setting, QuickCORE helps many companies to develop several applications and systems in accordance with any trends the industry develops.

Figure 5B:
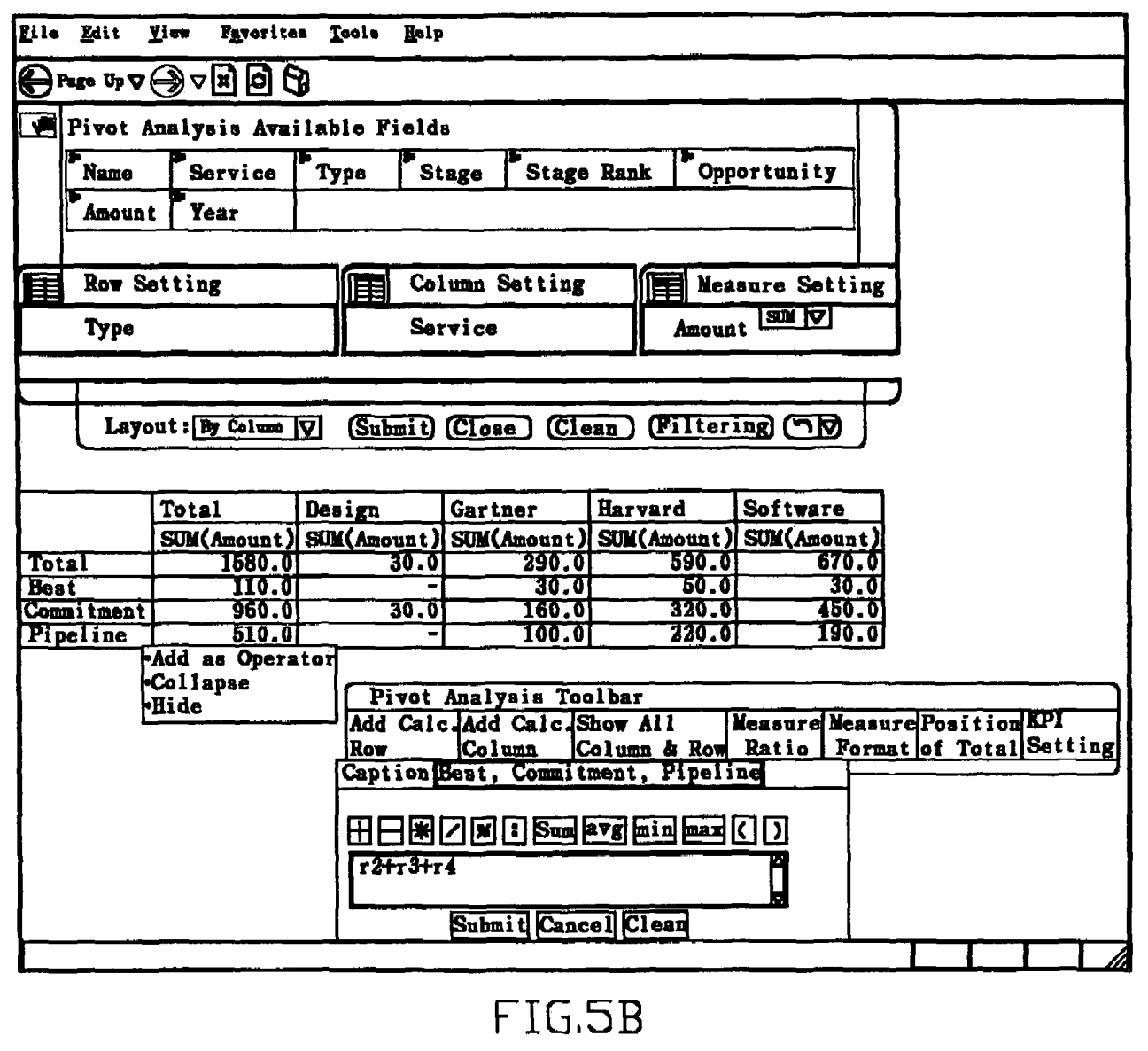
Figure 5C:
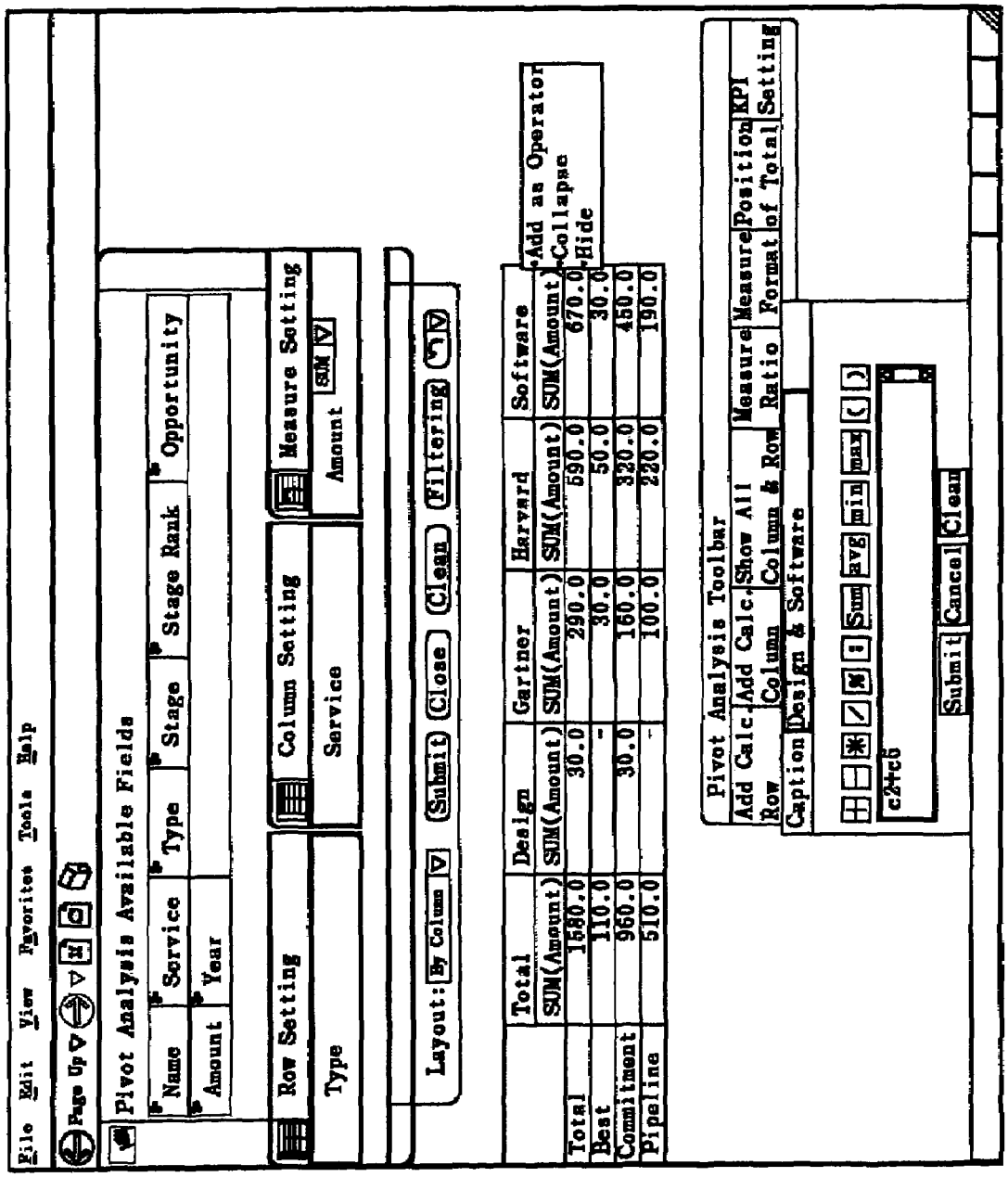
Figure 5D:
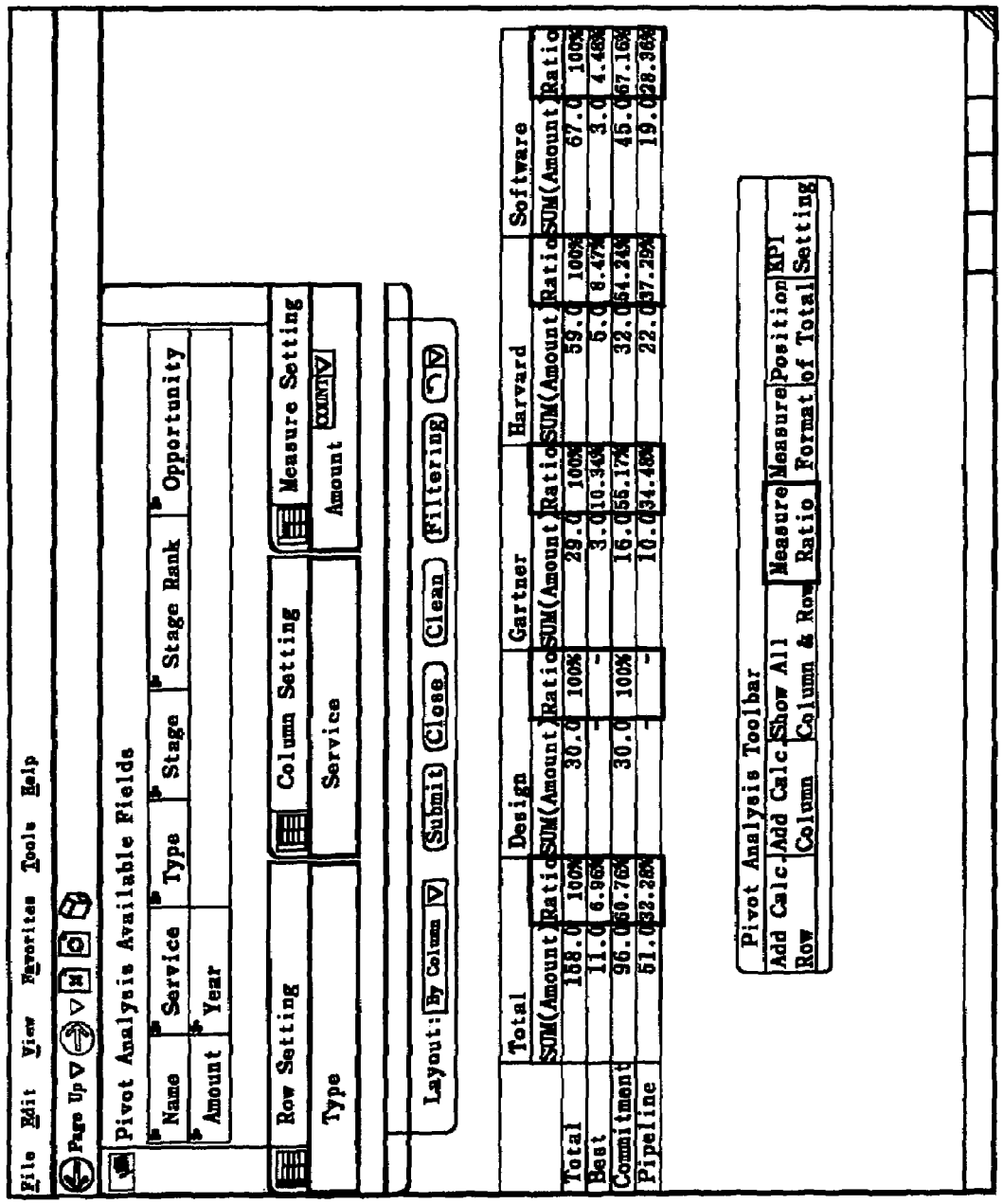
Figure 5E:
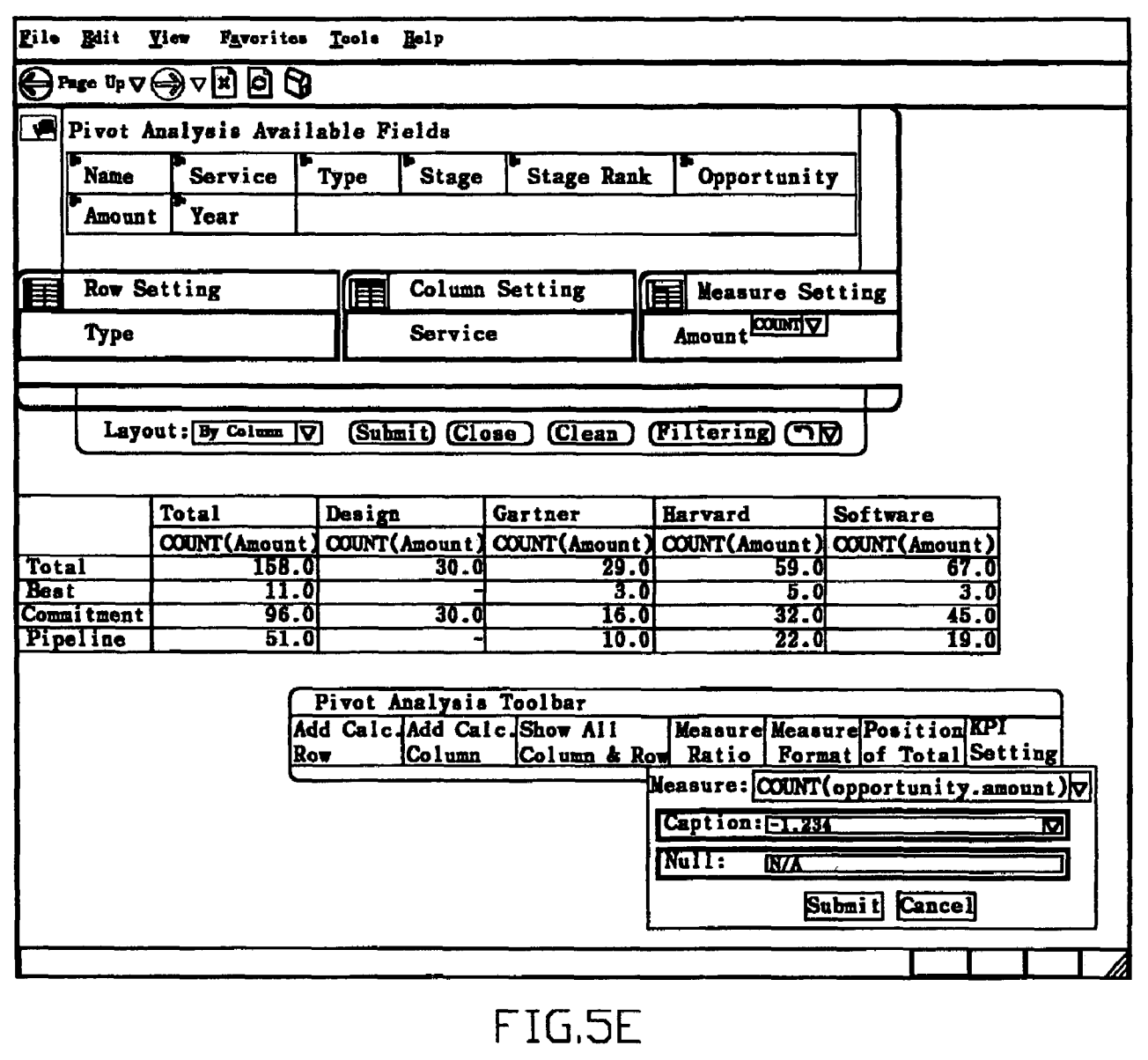

The method to carry out the above-mentioned pivot analysis mechanism along with QuickCORE includes, establishing the tables and data from the database, producing the relational tables and fields of a pivot analysis by using the QuickCORE client editor. And next, saving the web pages and then being uploaded to the QuickCORE server. FIG. 5A~FIG. 5O are the diagrams of the pivot analysis mechanism along with Quick-CORE illustrating the features of data analysis and data layout with Microsoft Explorer. As is shown in FIG. 5A, it depicts one example of setting option of the system. As is shown in FIG. 5B, it depicts the function of adding a calculation column; that is, users can input a column equation to generate the calculation results of the additional column. Next, as is shown in FIG. 5C, it depicts the function of adding a calculation row; that is, users can input a row equation to generate the calculation results of the additional row. As is shown in FIG. 5D, it depicts the function of measure ratio, which includes percentage calculations of horizontal fields, vertical fields and total amount. As is shown in FIG. 5E, it depicts the function of measure setting, which includes setting data format of each measure item, for instance, the decimal place of a decimal, the representation of a grouping symbol and a negative sign. As is shown in FIG. 5F, it depicts the position of the total amount, which includes setting the total amount of a row (or a column) is positioned before the position of all items or after the position of all items.

Figure 5G:
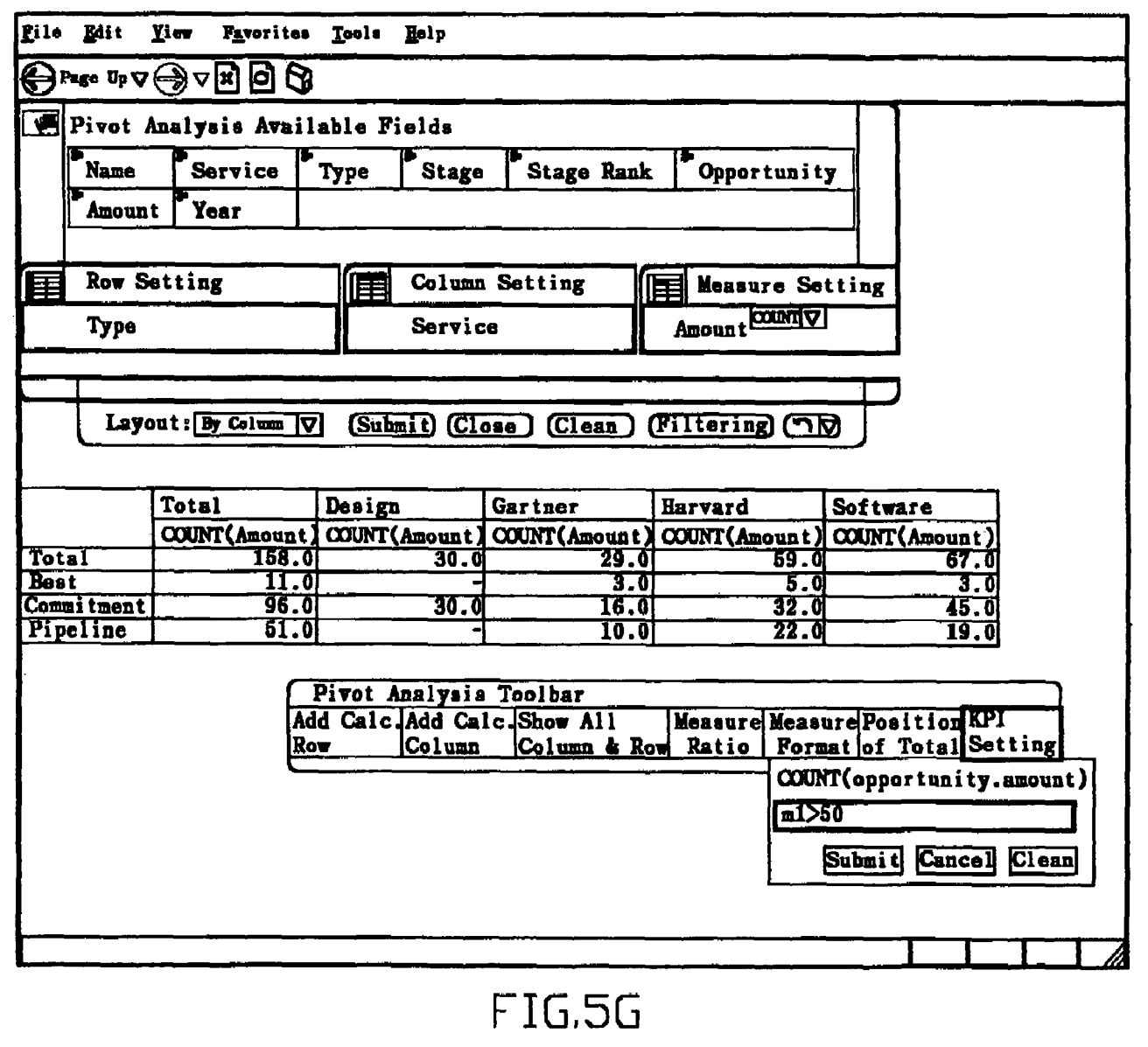
Figure 5H:
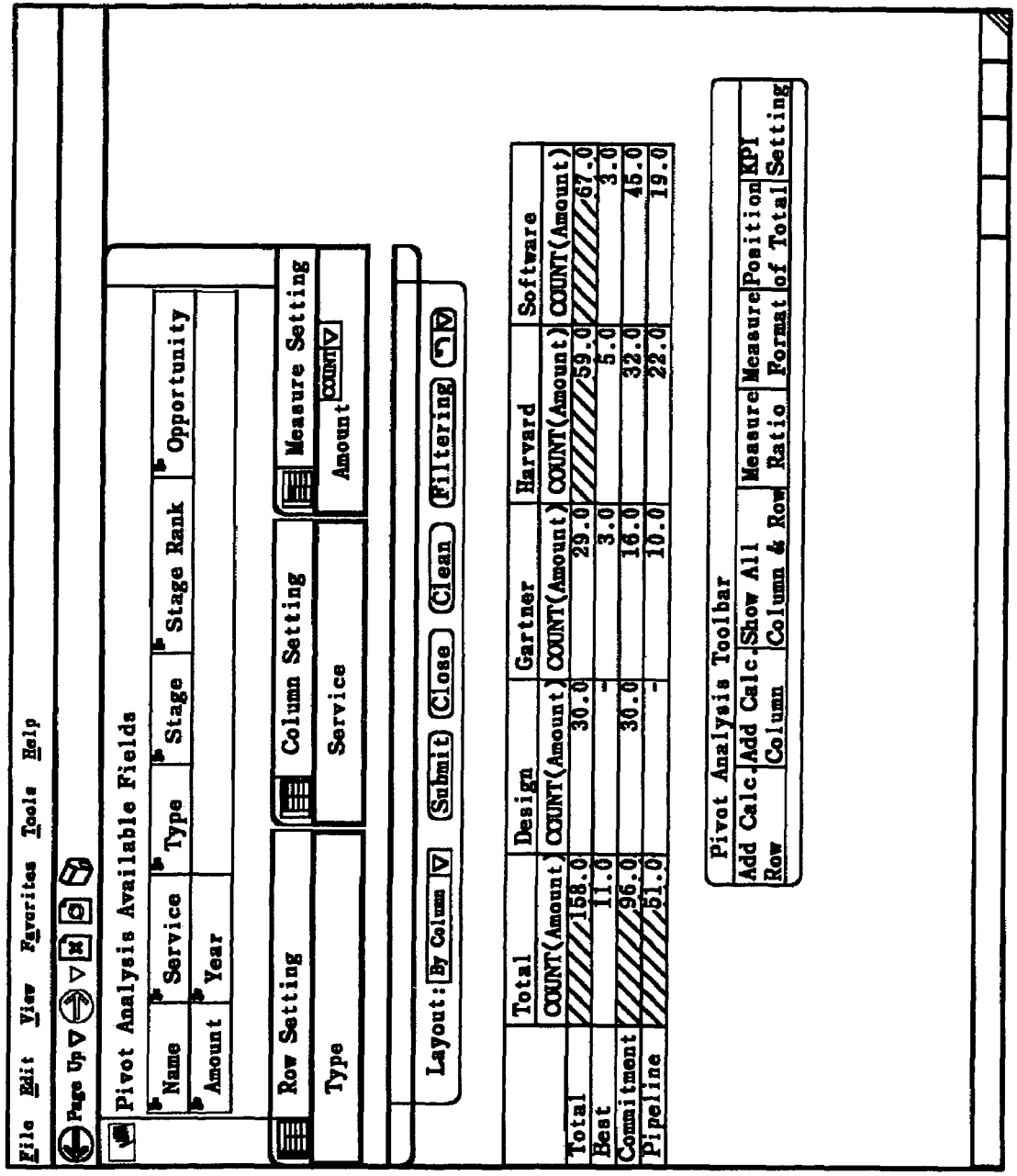
Figure 5I:
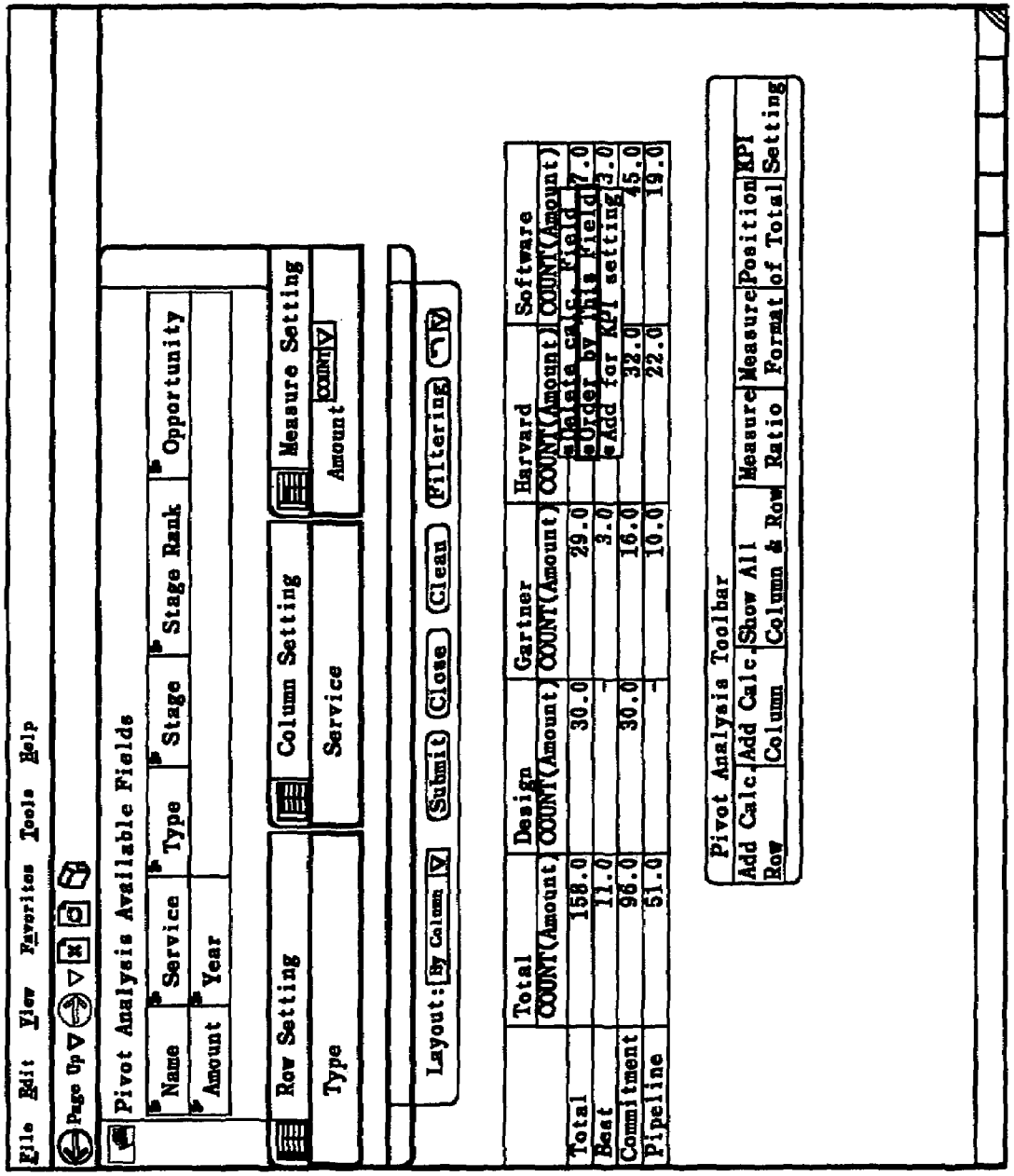
Figure 5J:
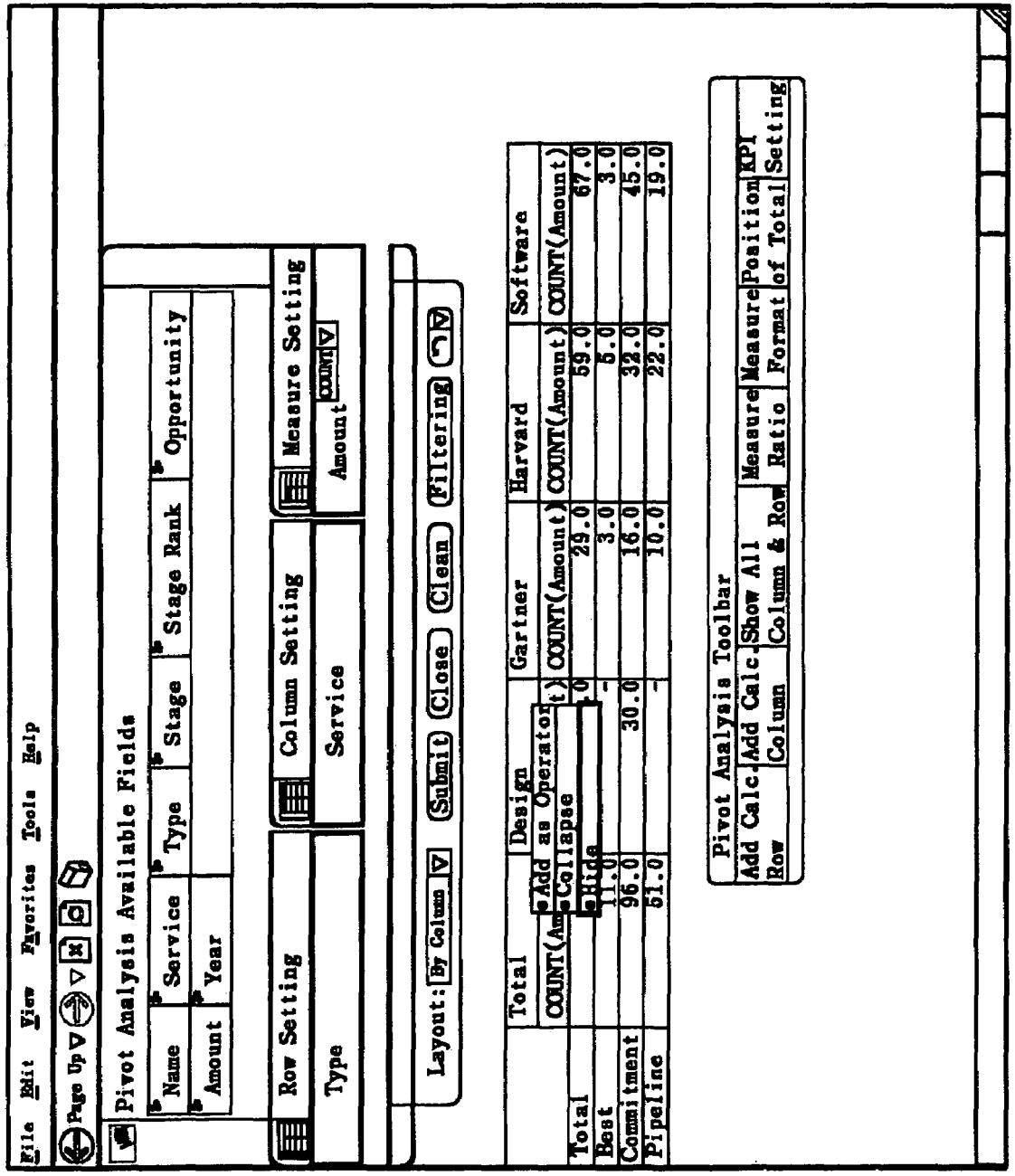
Figure 5K:
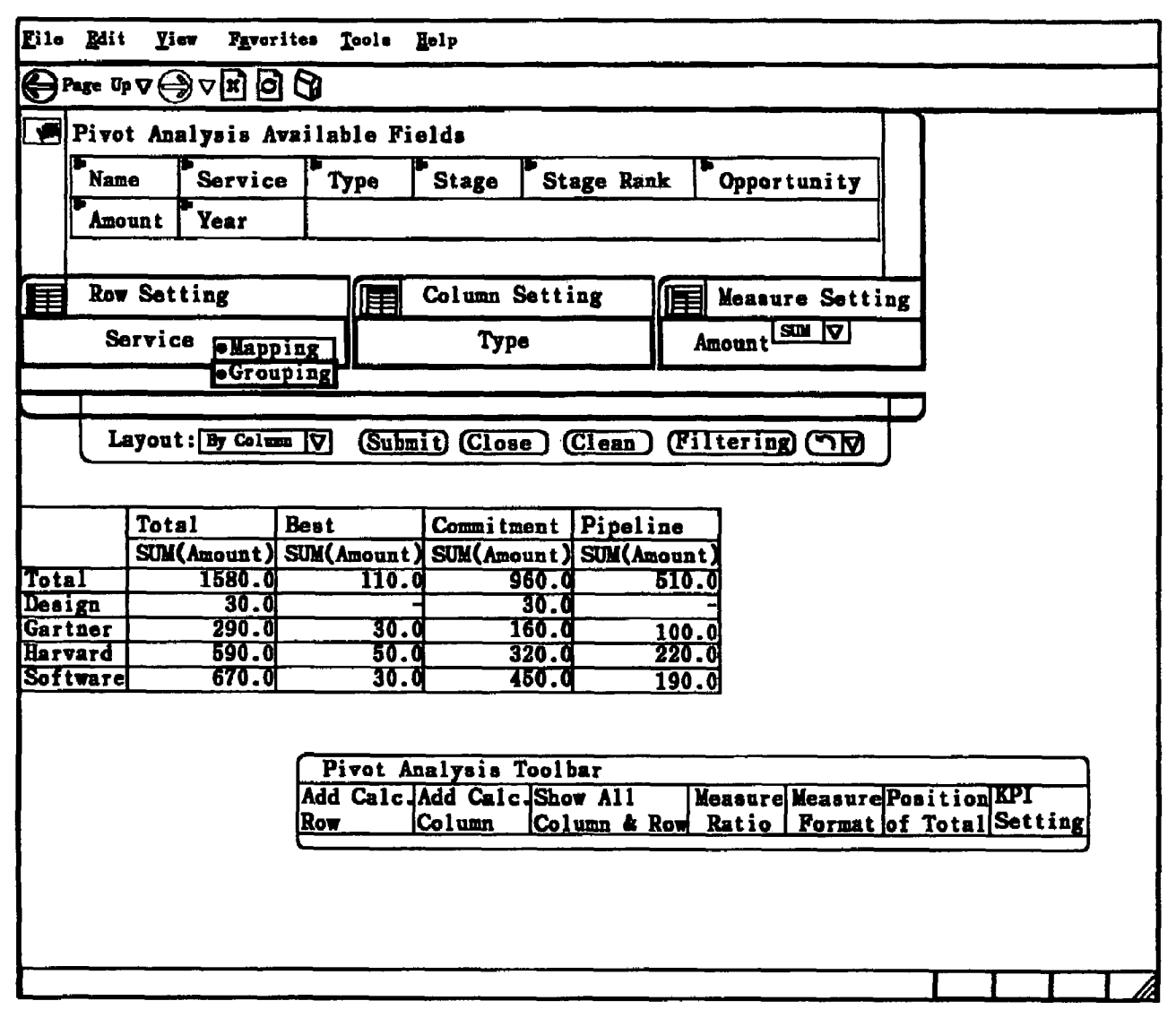
Figure 5L:
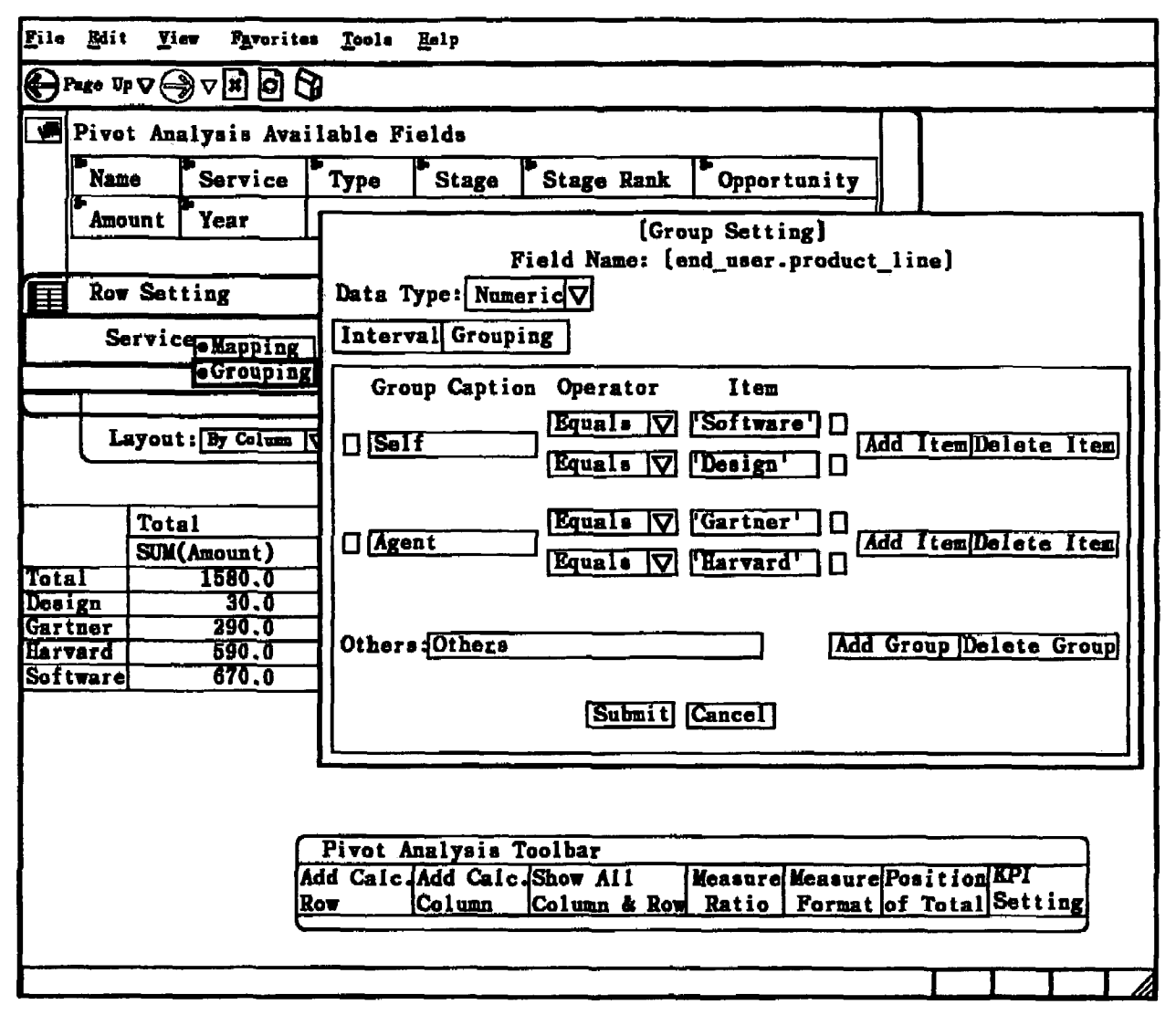
Figure 5M:
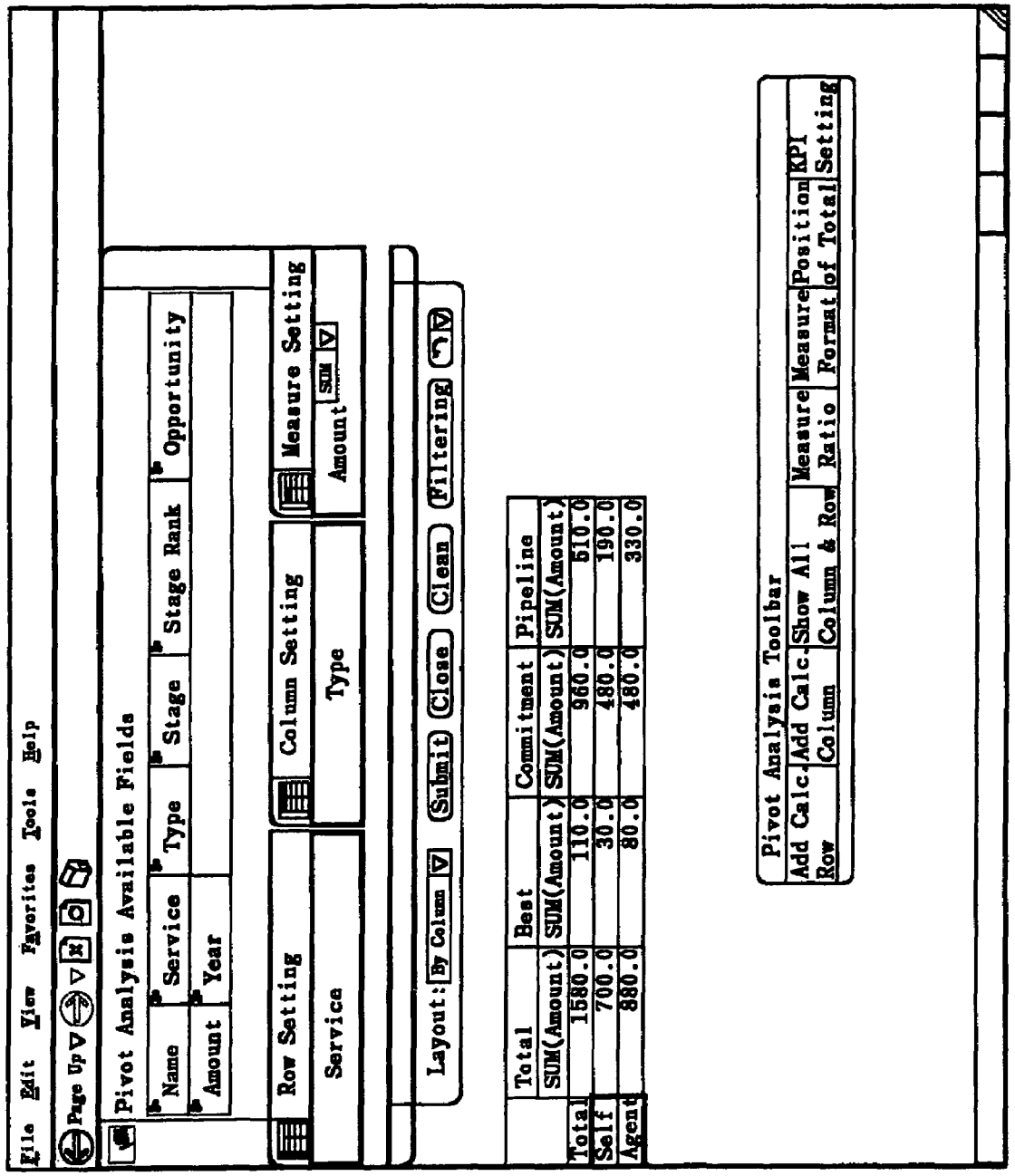

As are shown in FIG. 5G~FIG. 5H, the diagrams depict the function of KPI (Key Performance Indicator) setting, which makes the measure items in accordance with some specific conditions which are highlighted; thus the special data and something out of order will promptly be discovered. Next, as is shown in FIG. 5I, it depicts the function of measure sorting, which makes the data in order according to a measure field including two ways, ascension and descent. Next, as is shown in FIG. 5J, it depicts the function of roll-up and measure hiding, thus users can hide some rows (row field items) or columns (column field items). Further, when the row fields (or the column fields) include the hierarchical items, users can collapse the items of the next class and vice versa. And next, as are shown in FIG. 5K~FIG. 5M, the diagrams depict the function of data categorization, includes mapping and grouping. Further, users can group the different kind of data. As are shown in FIG. 5N~FIG. 5O, the diagrams depict the function of data layout including three ways: "layout by row field", "layout by column field" and "layout by measure field".

While this invention has been described with reference to illustrative embodiments, this description does not intend or construe in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of data processing in a relational database for performing a pivot analysis through a network, comprising:
   acquiring raw data from said relational database via a series of designated SQL (Structured Query Language) commands, wherein said raw data is multi-level hierarchical dimension data, and a number of SQL commands used to acquire the raw data is calculated according to an equation $NSQL = (NR \div 1) \times (Nc \div 1)$, wherein NSQL represents a number of SQL commands used to acquire data, NR represents a number of rows of the raw data, and Nc represents a number of columns of the raw data;
   converting said raw data into first markup language data via designated hierarchial sorting;
   converting said first markup language data into second markup language data by using a stylesheet transformation method, wherein said first markup language data is different with said second markup language data, and said first and second markup language data can be transferred through said network; and
   outputting said second markup language data through said network.

2. The method according to claim 1, wherein said first markup language data is XML (eXtensible Markup Language) data.

3. The method according to claim 1, wherein the step of converting said raw data into said first markup language data is performed by using the designated SQL commands and the designated hierarchical sorting.

4. The method according to claim 1, whrein said stylesheet transformation method is XSLT (XSL Transformations).

5. The method according to claim 4, wherein said stylesheet transformation method is performed by using the stylesheets of XSL (eXtensible Stylesheet Language).

6. The method according to claim 1, wherein said second markup language data is HTML (Hypertext Markup Language) data.

7. The method according to claim 1, wherein said relational database is selected from the group consisting of IBM, UNIX, Sybase, Oracle and Microsoft Access.

8. The method according to claim 1, further comprising performing a post process of said second markup language data.

9. The method according to claim 8, wherein said post process is a calculation and said calculation comprises column calculation, row calculation and percentage calculation of measure fields.

10. The method according to claim 9, wherein said calculation is performed by using XSL.

11. A pivot analysis module of performing data processing in a database, comprising:
- a processor for executing the instructions in the module;
- a relational database having raw data therein; wherein said raw data is multi-level hierarchical dimension data;
- a pivot transformation mechanism, having instructions executed by the processor, configured to acquire the raw data and perform a data conversion on the raw data, wherein the raw data is acquired from said relational database via a series of designated SQL (Structured Query Language) commands, and a number of SQL commands used to acquire the raw data is calculated according to an equation $$NSQL=(Nr+1)\times(Nc+1),$$

wherein NSQL represents a number of rews of the raw data, and Nc represents a number of columns of the raw data;
- a DOM (Document Object Model) mechanism, having instructions executed by the processor configured to dynamically access said raw data;
- a data post-processing mechanism, having instructions executed by the processor to perform a post processing: and
- an output for outputting a result of said post processing from said pivot analysis module.

12. The pivot analysis module according to claim 11, wherein said relational database is selected from the group consisting of IBM, UNIX, Sybase, Oracle and Microsoft Access.

13. The pivot analysis module according to claim 11, wherein said data post-processing mechanism comprises a data calculation mechanism.

14. The pivot analysis module according to claim 13, wherein said data calculation mechanism is configured to perform a calculation, and said calculation comprises column calculation, row calculation and percentage calculation of measure fields.

15. The pivot analysis module according to claim 13, wherein said data calculation mechanism is configured to perform a calculation by using XSL.

16. The pivot analysis module according to claim 11, wherein said pivot transformation mechanism is configured to convert said raw data into XML data.

17. The pivot analysis module according to claim 11, wherein said pivot transformation mechanism is configured to perform a XSLT.

18. The pivot analysis module according to claim 16, wherein said pivot transformation mechanism is configured to convert said XML data into HTML data.

* * * * *